United States Patent
Prakah-Asante et al.

(10) Patent No.: US 10,493,913 B2
(45) Date of Patent: Dec. 3, 2019

(54) ENHANCED REAR OBSTACLE DETECTION

(71) Applicant: Ford Global Technologies, LLC, Dearborn, MI (US)

(72) Inventors: Kwaku O. Prakah-Asante, Commerce Township, MI (US); Basavaraj Tonshal, Northville, MI (US); Yifan Chen, Ann Arbor, MI (US); Padma Aiswarya Kolisetty, Chennai (IN); Hsin-hsiang Yang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/755,791

(22) PCT Filed: Sep. 28, 2015

(86) PCT No.: PCT/US2015/052556
§ 371 (c)(1),
(2) Date: Feb. 27, 2018

(87) PCT Pub. No.: WO2017/058136
PCT Pub. Date: Apr. 6, 2017

(65) Prior Publication Data
US 2018/0326904 A1 Nov. 15, 2018

(51) Int. Cl.
*B60Q 9/00* (2006.01)
*B60W 40/10* (2012.01)
*G01S 13/93* (2006.01)
*G08G 1/16* (2006.01)
*G06K 9/00* (2006.01)
*B60W 30/095* (2012.01)
*B60W 40/105* (2012.01)

(52) U.S. Cl.
CPC ........ *B60Q 9/008* (2013.01); *B60W 30/0953* (2013.01); *B60W 40/10* (2013.01); *B60W 40/105* (2013.01); *G01S 13/931* (2013.01); *G06K 9/00369* (2013.01); *G06K 9/00805* (2013.01); *G06K 9/00845* (2013.01); *G08G 1/165* (2013.01); *G08G 1/166* (2013.01); *G08G 1/168* (2013.01); *G01S 2013/9353* (2013.01); *G01S 2013/9364* (2013.01); *G01S 2013/9367* (2013.01); *G01S 2013/9378* (2013.01)

(58) Field of Classification Search
None
See application file for complete search history.

(56) References Cited

U.S. PATENT DOCUMENTS

| | | |
|---|---|---|
| 6,594,614 B2 | 7/2003 | Studt et al. |
| 7,148,794 B2 | 12/2006 | Stigall |
| 7,375,620 B2 | 5/2008 | Balbale et al. |

(Continued)

OTHER PUBLICATIONS

International Search Report and Written Opinion dated Dec. 28, 2015 re PCT/US2015/052556.

*Primary Examiner* — Leon Viet Q Nguyen
(74) *Attorney, Agent, or Firm* — Brandon Hicks; Bejin Bieneman PLC

(57) ABSTRACT

A first output mechanism in a wearable device is actuated when a vehicle reverse speed exceeds a first threshold. A second output mechanism in a vehicle is actuated when a rear obstacle collision detection controller detects an impending collision with a rear obstacle.

18 Claims, 2 Drawing Sheets

(56) References Cited

U.S. PATENT DOCUMENTS

| | | |
|---|---|---|
| 7,908,060 B2 | 3/2011 | Basson et al. |
| 8,082,101 B2 | 12/2011 | Stein et al. |
| 8,599,027 B2 | 12/2013 | Sanchez |
| 2005/0073438 A1* | 4/2005 | Rodgers ................ G08G 1/161 |
| | | 340/944 |
| 2005/0168331 A1 | 8/2005 | Gunderson |
| 2007/0132563 A1* | 6/2007 | Balbale ................. B60Q 9/004 |
| | | 340/435 |
| 2010/0106413 A1* | 4/2010 | Mudalige ............. B60W 40/02 |
| | | 701/469 |
| 2013/0289837 A1* | 10/2013 | Beams ............ B60W 30/18027 |
| | | 701/51 |
| 2014/0309863 A1* | 10/2014 | Ricci ................. G01C 21/3484 |
| | | 701/36 |
| 2014/0343793 A1* | 11/2014 | Lavoie .................. B62D 13/06 |
| | | 701/41 |
| 2015/0006067 A1* | 1/2015 | Lees ...................... H04L 67/12 |
| | | 701/118 |
| 2015/0046062 A1 | 2/2015 | Davidson et al. |
| 2015/0298611 A1* | 10/2015 | Komoguchi ........... G08G 1/166 |
| | | 340/435 |

* cited by examiner

ENHANCED REAR OBSTACLE DETECTION

CROSS-REFERENCE TO RELATED APPLICATION

This patent application is filed under 35 U.S.C. § 371 as a national stage of, and as such claims priority to, International Patent Application No. PCT/US2015/052556, filed on 28 Sep. 2015, the foregoing application is incorporated herein by reference in its entirety.

BACKGROUND

Rear obstacle detection systems provide a way for vehicle drivers to take action if a collision with a rear obstacle is imminent. An important feature of such systems may be providing output indicating an imminent rear collision so that the driver can take corrective action. However, current mechanisms to provide output concerning an imminent rear collision do not provide output targeted, tailored, or calibrated to a driver.

DETAILED DESCRIPTION

Figure 1:
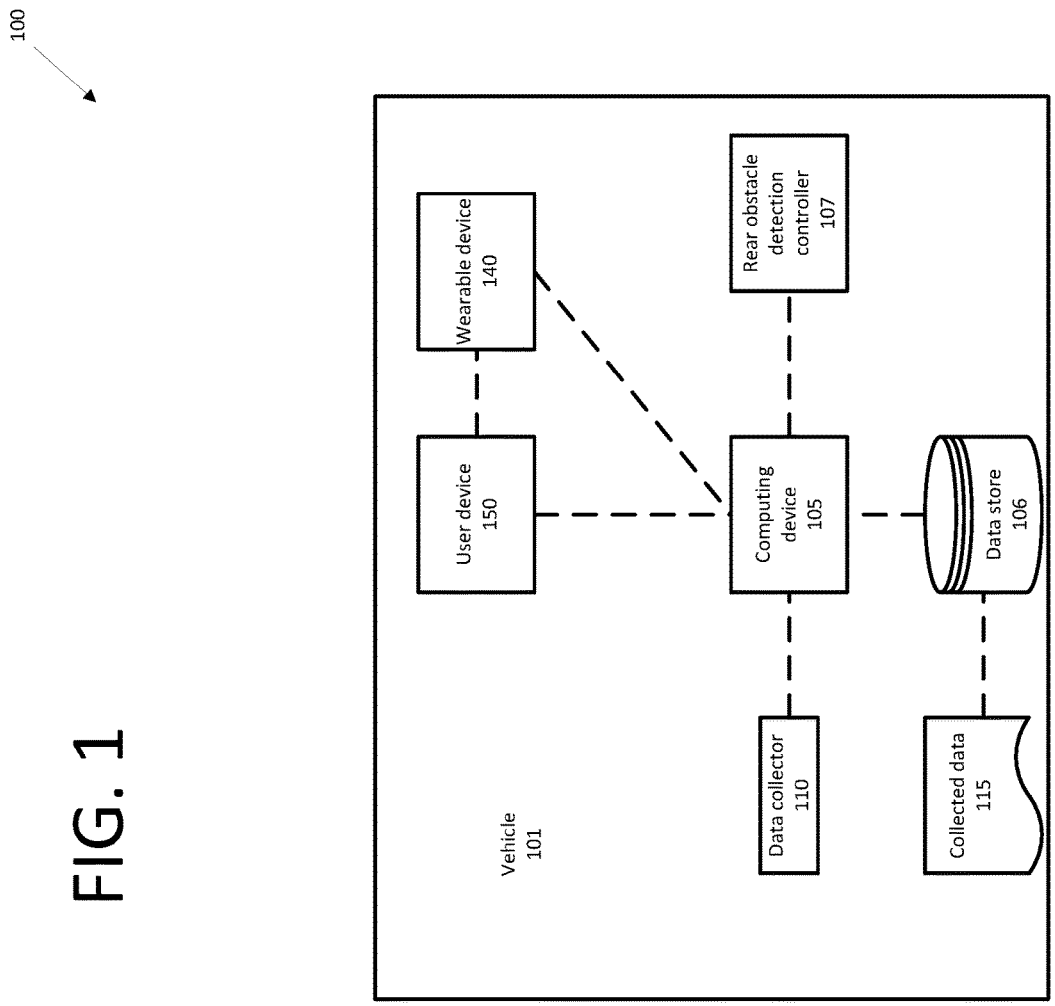
FIG. 1 is a block diagram of an example system including a wearable device providing output indicating a possible collision with a rear obstacle.

FIG. 1 illustrates a system 100 including a wearable device 140 communicatively coupled, e.g., via a known wireless protocol, to a vehicle 101 computing device 105. The computing device 105 is programmed to receive collected data 115, from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering, rear obstacle data, biometric data related to a vehicle 101 operator, e.g., heart rate, respiration, pupil dilation, body temperature, state of consciousness, etc. Further examples of such metrics may include measurements of vehicle systems and components (e.g. a steering system, a powertrain system, a brake system, internal sensing, external sensing, etc.). The computing device 105 may be programmed to collect data 115 from the vehicle 101 in which it is installed, sometimes referred to as a host vehicle 101, and/or may be programmed to collect data 115 about a second vehicle 101, e.g., a target vehicle.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, e.g., WiFi, Bluetooth, or the like, the computing device 105 may transmit messages to various devices in a vehicle 101, e.g., devices 140, 150 discussed below, and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure.

The data store 106 may be of any known type, e.g., hard disk drives, solid-state drives, servers, or any volatile or non-volatile media. The data store 106 may store the collected data 115 sent from the data collectors 110.

The computer 105 may be programmed for rear obstacle detection, e.g., as is known. For example, the computer 105 processor could execute instructions to determine whether the vehicle 101 is about to collide (e.g., there is a risk of collision within a certain amount of time, e.g., 3 seconds, above a risk threshold) with a rear obstacle and, upon such determination, to actuate one or more vehicle mechanisms without driver intervention, e.g., braking, steering, throttle, etc. Further, a rear obstacle detection controller 107 may be included or be connected to an output mechanism to indicate a rear obstacle collision, e.g., sounds and/or visual indicators provided via the vehicle 101 HMI.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101. Further, sensors or the like, could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to measure a distance between the vehicle 101 and other vehicles or objects, e.g. a rear obstacle. Yet other data collectors 110 could include cameras, breathalyzers, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated in the computer 105. In general, collected data 115 may include any data that may be gathered by the data collectors 110 and/or computed from such data.

The wearable device 140 may be any one of a variety of computing devices including a processor and a memory, as well as communication capabilities that is programmed to be worn on a driver's body. For example, the wearable device 140 may be a watch, a smart watch, a vibrating apparatus, etc. that includes capabilities for wireless communications using IEEE 802.11, Bluetooth, and/or cellular communications protocols. Further, the wearable device 140 may use such communications capabilities to communicate directly with a vehicle computer 105, e.g., using Bluetooth.

The system 100 may include the user device 150. The user device 150 may be any one of a variety of computing devices including a processor and a memory, e.g., a smartphone, a tablet, a personal digital assistant, etc. The user device 150 may communicate with the vehicle computer 105 and the wearable device 140 over the CAN bus, OBD, and/or other wireless mechanisms as described above.

Figure 2:
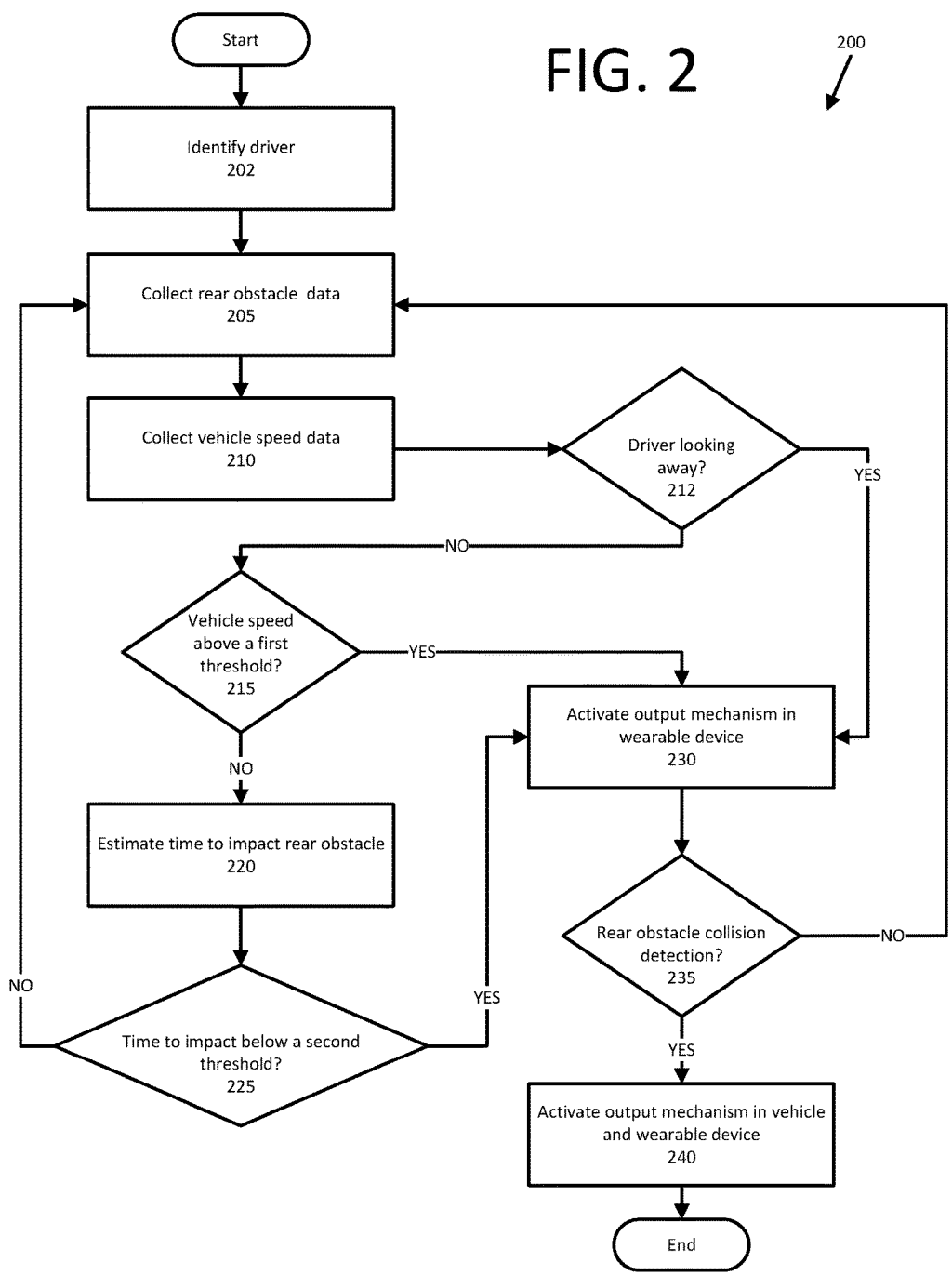
FIG. 2 is an example process for providing an indication of a possible collision with a rear obstacle from a wearable device.

FIG. 2 illustrates a process 200 for employing the wearable device 140 in conjunction with the rear obstacle collision controller 107. The process 200 begins in a block 202, in which the computing device 105 identifies a vehicle 101 occupant. The computing device 105 may identify the driver in one or more manners, e.g., receiving data from one or more of the wearable device 140, the user device 150, and/or the data collectors 110. For example, as is known, the occupant could be identified using image recognition techniques in the computer 105 using data 115 from a camera data collector 110, a user identity could be input via a wearable device 140 of a vehicle 101 HMI, or the wearable device 140 could identify the user/occupant via collected biometric data, e.g., a fingerprint, etc. Upon identifying the occupant, the computing device 105 may retrieve from its data store 106 information about the occupant, including age, size, driving skill level, preferred mechanisms for receiving information (e.g., haptic, audio, etc.), etc.

Next, in a block 205, the computing device 105 collects data 115 about a rear obstacle. The data 115 may include visual data, radar, lidar, sonar, etc.

Next, in a block 210, the computing device 105 collects data 115 specifying vehicle 101 speed. The data 115 may come from, e.g., speedometers, accelerometers, etc.

Next, in a block 212, the computing device 105 determines whether the driver is looking away from the control cluster. In conventional rear driving scenarios, the driver may look at the control cluster to see feed from a rear camera to see if there are any rear obstacles. The vehicle 101 may have an internal camera to detect whether the driver is looking at the control cluster during the rear driving scenario. If the driver is looking at the control cluster, the process 200 continues in a block 215. Otherwise, the process continues in a block 230. Alternatively, the driver may be looking through a rear window, and the computing device 105 may determine whether the driver is looking out the rear window. In some implementations, block 212 may be skipped, i.e., the computing device does not check whether the driver is looking toward the control cluster or through the rear window.

In the block 215, the computing device determines whether the vehicle 101 speed is above a first threshold. The first threshold may be, e.g., an average reverse speed measured over a period of time, a recommended reverse speed, etc., and may be stored in the data store 106 and retrieved upon identification of the driver in the block 202. An exemplary first threshold may be 10 miles per hour to avoid excessive rear maneuvering for novice drivers. If the vehicle 101 speed is above the first threshold, then the process 200 continues in a block 230. Otherwise, the process 200 continues in a block 220. The first threshold may alternatively be stored on the user device 150. Alternatively, the user device 150 may use the vehicle 101 speed data and determine whether the vehicle speed is above the first threshold.

In the block 220, the computing device 105 estimates a time to impact the rear obstacle. That is, the computing device uses data 115 collected in the blocks 205 and 210 to estimate the time until the vehicle 101 impacts the rear obstacle. For example, data 115 on the distance between the vehicle 101 and the rear obstacle may be used with the current vehicle speed to estimate the time to impact as follows:

$$t_{impact} = \frac{d_{obstacle}}{v_{closing}}$$

where $t_{impact}$ is the estimated time to impact, $d_{obstacle}$ is the distance between the vehicle 101 and the rear obstacle, and $v_{closing}$ is the velocity between the current speed of the vehicle 101 and the rear obstacle.

Next, in a block 225, the computing device 105 determines whether the estimated time to impact is below a second threshold. The second threshold may be based on, e.g., a time required to brake based on the current vehicle 101 speed, an average reaction time for the occupant, etc., and may be stored in the data store 106 and retrieved upon identification of the driver in the block 202. An exemplary second threshold may be 1.2 seconds. If the time to impact is below the second threshold, the process 200 continues in the block 230. Otherwise, the process 200 returns to the block 205 to collect more data.

In the block 230, the computing device 105 provides an instruction to the wearable device 140 to actuate one or more output mechanisms. The output mechanisms may include haptic output, e.g. a vibration, audio output, and/or visual output, e.g. flashing lights, flashing colors, etc. Based on the information from the block 202, the one or more output mechanism may be selected according to the occupant. For example, an occupant who is hard of hearing may have a stronger vibration output, while another occupant may prefer a visual output. Advantageously, the computing device 105 may be programmed, e.g., including setting the threshold of the block 215, to cause actuation of the wearable device output prior to an alert, warning, or evasive action implemented by a conventional rear obstacle detection controller 107, e.g., a system that provides an indication of, or reacts to, an imminent rear collision by actuating vehicle lights, sounds, brakes, etc. Alternatively, the user device 150 may provide the instruction to the wearable device to actuate the output mechanisms.

Next, in a block 235, the computing device 105 determines whether the rear obstacle detection controller 107 detects an imminent rear collision, i.e., the vehicle 101 will impact the rear obstacle in the next few seconds. The rear obstacle detection controller may use radar or vision systems to collect distance and closing velocity information to determine whether a collision is imminent and to actuate conventional response systems. The rear obstacle detection controller uses the data 115 to determine whether the vehicle 101 is about to impact the rear obstacle. If the rear obstacle detection controller detects an imminent rear collision, the process 200 continues in a block 240. Otherwise, the process 200 returns to the block 205 to collect more data.

In the block 240, the computing device 105 activates one or more second output mechanisms, i.e. a vehicle alert, using the rear collision detection controller 107 and the process 200 ends. The computing device 105 may also send a supplemental instruction to the wearable device 140 to actuate the one or more output mechanisms. The second output mechanisms may include, e.g., a vibrating steering wheel, an alarm through the vehicle speakers, a flashing light on the dashboard, etc.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer in a vehicle including a processor and a memory, the memory storing instructions executable by the computer to:
provide a first output in a wearable device of an occupant in the vehicle when a reverse speed of the vehicle exceeds a first threshold received by the computer of the vehicle from a handheld user device of the occupant in the vehicle; and
provide a second output in the vehicle when a rear obstacle collision detection controller detects an impending collision with a rear obstacle.

2. The system of claim 1, wherein the instructions further include instructions to adjust the first threshold upon identification of the occupant.

3. The system of claim 1, wherein the instructions further include instructions to estimate a time to impact the rear obstacle and provide the first output when the time to impact the rear obstacle is below a second threshold.

4. The system of claim 2, wherein the instructions further include instructions to adjust the second threshold upon identification of the occupant.

5. The system of claim 1, wherein the first output is a haptic output.

6. The system of claim 1, wherein the first threshold is an average reverse speed of the vehicle.

7. The system of claim 1, wherein the instructions further include instructions to provide the first output upon receiving data from an interior vehicle camera indicating that the occupant is looking away from a control cluster of the vehicle.

8. The system of claim 1, wherein the instructions further include instructions to send reverse speed data of the vehicle to the handheld user device and the handheld user device is programmed to provide the first output in the wearable device when the reverse speed of the vehicle exceeds the first threshold.

9. The system of claim 1, wherein the instructions further include instructions to provide the first output in the wearable device when the rear obstacle collision controller detects an impending collision with the rear obstacle.

10. A method, comprising:
providing a first output in a wearable device of an occupant in a vehicle when a reverse speed of the vehicle exceeds a first threshold received from a handheld user device of the occupant in the vehicle; and
providing a second output in the vehicle when a rear obstacle collision detection controller detects an impending collision with a rear obstacle.

11. The method of claim 10, further comprising adjusting the first threshold upon identification of the occupant.

12. The method of claim 10, further comprising estimating a time to impact the rear obstacle and providing the first output when the time to impact the rear obstacle is below a second threshold.

13. The method of claim 11, further comprising adjusting the second threshold upon identification of the occupant.

14. The method of claim 10, wherein the first output is a haptic output.

15. The method of claim 10, wherein the first threshold is an average reverse speed of the vehicle.

16. The method of claim 10, further comprising providing the first output upon receiving data from an interior vehicle camera indicating that the occupant is looking away from a control cluster of the vehicle.

17. The method of claim 10, further comprising sending reverse speed data of the vehicle to the handheld user device and providing the first output in the wearable device with the handheld user device upon determining that the reverse speed data exceeds the first threshold with the handheld user device.

18. The method of claim 10, further comprising providing the first output in the wearable device when the rear obstacle collision controller detects an impending collision with the rear obstacle.

* * * * *